US008677754B2

(12) United States Patent
Lueck et al.

(10) Patent No.: US 8,677,754 B2
(45) Date of Patent: Mar. 25, 2014

(54) FUEL SUPPLY SYSTEM FOR A GAS-TURBINE ENGINE

(75) Inventors: Rudolf Lueck, Nuthetal (DE); Dominik Giugno, Berlin (DE); Christian Otterbach, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1227 days.

(21) Appl. No.: 12/501,602

(22) Filed: Jul. 13, 2009

(65) Prior Publication Data
US 2010/0005776 A1 Jan. 14, 2010

(30) Foreign Application Priority Data

Jul. 11, 2008 (DE) .......................... 10 2008 032 565

(51) Int. Cl.
*F02C 7/264* (2006.01)
*F02C 7/232* (2006.01)

(52) U.S. Cl.
USPC ......................................... 60/734; 60/39.826

(58) Field of Classification Search
USPC ............. 60/39.281, 786, 790, 733, 734, 739, 60/740, 39.826; 137/599.06, 599.07
See application file for complete search history.

(56) References Cited

U.S. PATENT DOCUMENTS

| | | | |
|---|---|---|---|
| 3,306,037 A | 2/1967 | Fortmann et al. | |
| 3,688,495 A * | 9/1972 | Fehler et al. | ............... 60/39.281 |
| 4,027,474 A | 6/1977 | Demase | |
| 5,365,732 A | 11/1994 | Correa | |
| 6,250,063 B1 | 6/2001 | Davis, Jr. et al. | |
| 6,434,945 B1 | 8/2002 | Mandai et al. | |
| 6,813,876 B2 | 11/2004 | Griffiths et al. | |
| 7,007,476 B2 | 3/2006 | Mains et al. | |
| 7,024,862 B2 | 4/2006 | Miyake et al. | |
| 7,036,302 B2 | 5/2006 | Myers Jr. et al. | |

(Continued)

FOREIGN PATENT DOCUMENTS

| DE | 1476923 | 7/1970 |
|---|---|---|
| DE | 2700473 | 7/1977 |

(Continued)

OTHER PUBLICATIONS

European Search Report dated Jan. 4, 2013 from counterpart application.

(Continued)

*Primary Examiner* — Andrew Nguyen
(74) *Attorney, Agent, or Firm* — Timothy J. Klima; Shuttleworth & Ingersoll, PLC (57) ABSTRACT

On a fuel supply system for a gas-turbine engine with a high-pressure supply line and a fuel metering unit, the fuel distribution system connected to staged or non-staged burners includes only one single fuel line (3) and the valve arrangements (7) connected to this fuel line and directly associated to individual burners (4), with the valve arrangements (7) each having several cutoff valves (8 to 10), which are— independently of each other—individually or simultaneously electrically settable to a closed or open limit position, with the cutoff valves each featuring a specific, yet different cross-sectional area. The simply designed, low-wear and low-maintenance fuel supply and distribution system, avoids coking in the one fuel line in the hot engine section, and enables a binary-coded fuel supply to the respective burner. With a sufficient number of valves in each arrangement, the fuel metering unit can be omitted.

15 Claims, 5 Drawing Sheets

(56) References Cited

U.S. PATENT DOCUMENTS

| | | | |
|---|---|---|---|
| 7,137,242 B2 | 11/2006 | Griffiths | |
| 7,568,349 B2 | 8/2009 | Hadley | |
| 2005/0097895 A1* | 5/2005 | Kothnur et al. | 60/776 |
| 2005/0198964 A1 | 9/2005 | Myers et al. | |
| 2005/0279101 A1 | 12/2005 | Hoffmann et al. | |
| 2006/0283191 A1* | 12/2006 | Horswill et al. | 60/773 |
| 2007/0119178 A1* | 5/2007 | Berenbrink et al. | 60/773 |
| 2007/0151252 A1* | 7/2007 | Cornwell et al. | 60/773 |
| 2008/0016875 A1 | 1/2008 | Ryan et al. | |

FOREIGN PATENT DOCUMENTS

| | | |
|---|---|---|
| DE | 69906677 | 10/2003 |
| DE | 10256193 | 6/2004 |
| DE | 60016331 | 11/2005 |
| EP | 1367325 | 3/2003 |

OTHER PUBLICATIONS

German Search Report dated Jun. 16, 2010 from counterpart German patent application.

\* cited by examiner

FUEL SUPPLY SYSTEM FOR A GAS-TURBINE ENGINE

This application claims priority to German Patent Application DE102008032565.1 filed Jul. 11, 2008, the entirety of which is incorporated by reference herein.

This invention relates to a fuel supply system for a gas-turbine engine with a high-pressure supply line, a fuel metering unit and a fuel distribution system connected to the burners, to control the fuel quantity supplied to the individual burners.

Multiple-line fuel supply systems including a high-pressure supply line, arranged in the cold section of the engine, with a fuel metering unit and a fuel staging unit are known from Specification U.S. Pat. No. 7,137,242 B2, for example. The staging unit distributes the metered fuel flow to at least one main burner line and to a pilot burner line which are arranged in the hot section of the engine and are connected to the main nozzles or the pilot nozzles, respectively, of the individual burners.

Specification U.S. Pat. No. 6,813,876 B2 describes a fuel supply system for a gas-turbine engine with a main burner fuel supply line and a pilot burner fuel supply line. A high-pressure pump delivers the fuel to the main burner and pilot burner supply lines. A throttling valve controls the fuel flow in the main burner supply line, while a metering valve controls the fuel flow in the pilot burner supply line.

The arrangement of two-part fuel line systems here provided, with supply lines separately associated to the pilot and the main nozzles of the individual burners, or even the arrangement of several supply lines for the main burners provided with control valves for variably supplying the burners with fuel, is disadvantageous in that, upon switching off certain burner groups, fuel stagnates in the temporarily deactivated lines situated in the hot section of the engine so that, due to coking of the fuel, parts of the fuel system are likely to be clogged, as a result of which precise control of the fuel supply to the individual burners or burner groups, which anyway is difficult to accomplish with the conventional, for example mechanical or pneumatic, valve actuating devices, as well as continuous, low-pollutant combustion are not ensured unless further measures for cooling the stagnant fuel in the hot section are taken which, however, entail other disadvantages, such as increased weight.

A multi-stage fuel supply system for a gas-turbine engine known from Specification U.S. Pat. No. 7,036,302 B2 includes a plurality of burners and at least first and second fuel injection circles in each burner, as well as first and second fuel nozzle valves in each burner which are controllably connected to the fuel injection circles of the respective burner. The fuel to be burned is supplied to all burners via a single fuel supply line, with the control of the valves being effected hydraulically via a signal fuel line using a differential pressure to the fuel pressure in the fuel supply line. The system described, besides being complicated, is disadvantageous in that heating of the fuel in the signal circuit will again incur the problems described in the above. Fuel supply via staging valves, which additionally are also described in detail in Specification U.S. Pat. No. 7,007,476 B2, requires high apparatus investment and has limited functionality in terms of staging.

A broad aspect of the present invention is to provide a simply designed fuel supply system for a gas-turbine engine which ensures precise, variable fuel distribution and metering to the individual, staged or non-staged, burners and, thus, stable, low-pollutant combustion, while having low-weight and small-size valves and, furthermore, requiring low maintenance and featuring a long service life.

The present invention, in its broad concept, provides a fuel distribution system associated to the plurality of burners which, in the hot engine section, includes only one fuel line (single fuel line) and, associated to each burner, a valve arrangement having several cutoff valves (pilot and/or main valves) which are—independently of each other—individually or simultaneously electrically settable to a closed or open limit position. Since the cutoff valves have a specific (constant) cross-sectional area differing from valve to valve, fuel supply is specifically—and variably—distributable to the individual burners and between the stages (pilot and main injection nozzle) of the same burner according to the on/off switching state of the cutoff valves of the valve arrangement. The electrically operated valve combination (bi-state or multi-state valves) so designed requires only little maintenance effort and is characterized by low wear, while ensuring stable combustion suited to the applicable operating and flying conditions without coking in the fuel distribution system, with the components of the distribution system having a long service life.

In development of the present invention, the electrically operated cutoff valves, which for the purpose of cooling can be circumcirculated by the fuel, are each connected to a single signal line to enable them to be actuated independently of each other. However, they are connected to a common return line, which can also be used as alternative signal line, so that the installation effort is low and also the weight can be kept small.

In development of the present invention, the valve arrangements provided for fuel distribution and/or metering can also be actuated independently of each other or in groups, with common signal or return lines being employable for functional groups of valves.

In development of the present invention, the valve arrangement includes a staging valve arrangement designed for staged burners having at least one pilot valve or main valve. According to the respective switching position (on or off) of the pilot and main valves the fuel flow is distributable between the pilot and the main injection nozzles of the staged burner. The pilot valve can here be provided such that it releases or closes a larger cross-section, while leaving open a smaller cross-section in the closed state.

In a further development of the present invention, the valve arrangement is provided as a binary distribution arrangement and, for fuel distribution to a staged burner, includes at least two pilot valves and/or at least two main valves, which are cross-sectionally dimensioned such that each valve is twice the size of the previous one. With n pilot valves or n main valves, respectively, the cross-sectional area of the $n^{th}$ pilot valve or main valve, respectively, is established from $A_n = 2^n \cdot A_0$, with $A_0$ being the smallest cross-sectional area $A_{min.}$ each. With a sufficiently large number of such binary-coded pilot and main valves, the binary distribution valve arrangement can simultaneously act as fuel metering valve arrangement for the respective, staged burners, enabling the fuel metering unit in the high-pressure supply line to be omitted and, accordingly, cost and weight of the fuel supply system to be reduced.

In a further development of the present invention, non-staged burners are provided with a binary metering valve arrangement including a plurality of cutoff valves with binary-coded cross-sectional size.

In a further development of the present invention, single (or all) cutoff valves with non-binary-coded cross-sectional sizes have two defined limit positions and one center position, enabling the number of required valves to be reduced, this being achievable by using a magnet as armature in a coil, for example.

In a further development of the present invention, single (or all) cutoff valves are designed such that in the de-energized state (failure case) either the last valve position is retained or the valve assumes a defined position.

The present invention is more fully described in light of the accompanying drawings showing exemplary embodiments. In the drawings.

Figure 1:
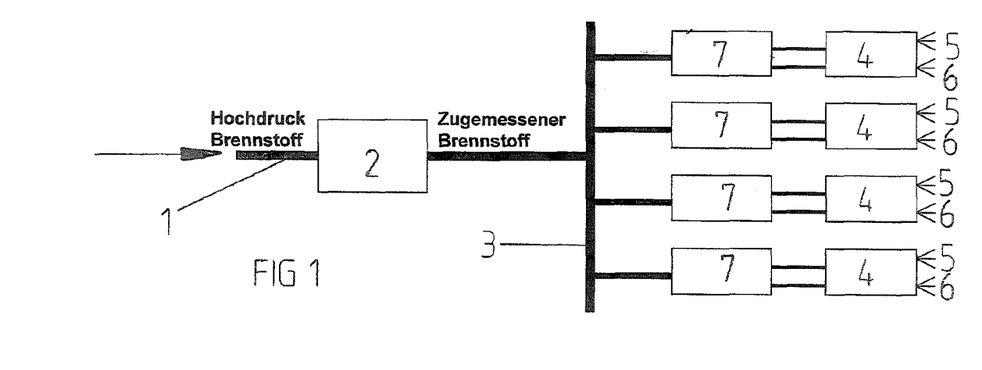
FIG. 1 shows a fuel supply system for a gas-turbine engine having a fuel metering unit and staged burners with a staging valve arrangement, with the staged burners being connected to a single fuel line and including each a main injection nozzle and a pilot injection nozzle.
Figure 2:
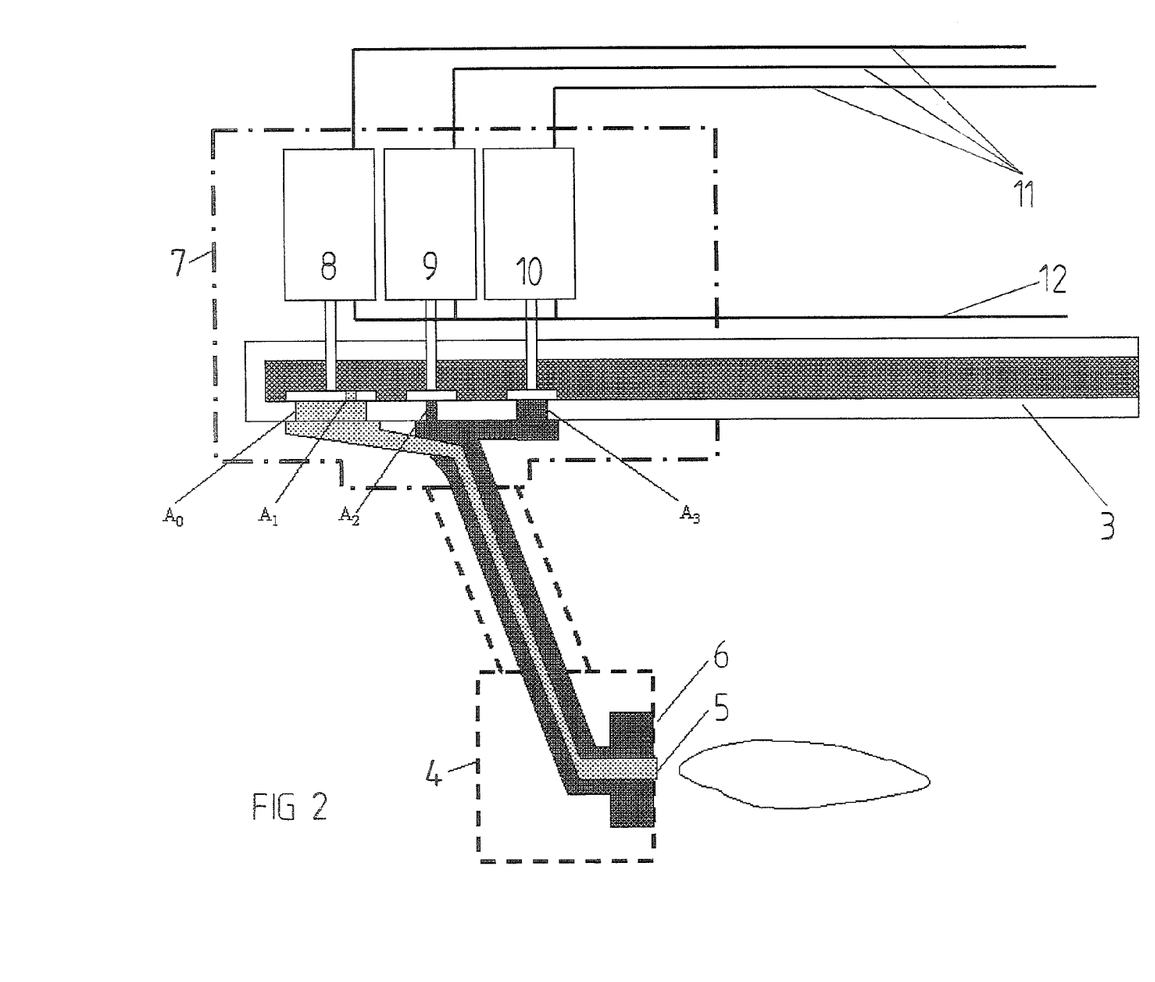
FIG. 2 is a detailed schematic representation of the staging valve arrangement as per FIG. 1 provided upstream of a staged burner for variably setting the fuel supply.
Figure 3A:
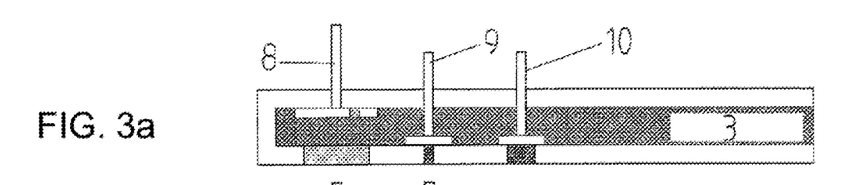
FIGS. 3a-3e are representations of the various switching states of the staging valve arrangement as per FIG. 2 for variable fuel supply to the pilot and the main injection nozzles.
Figure 3B:
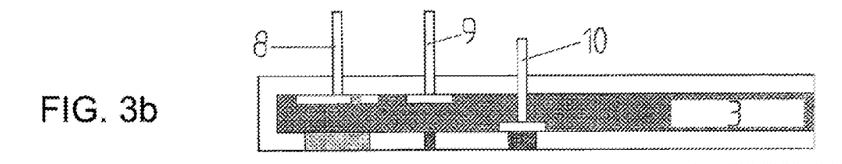
Figure 3C:
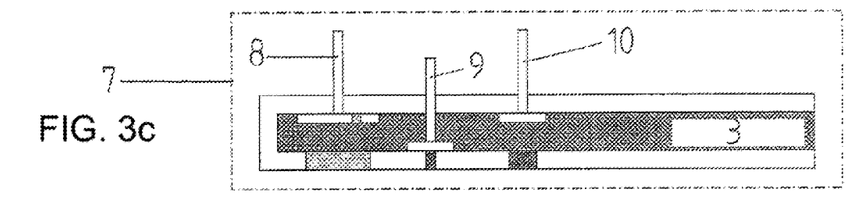
Figure 3D:
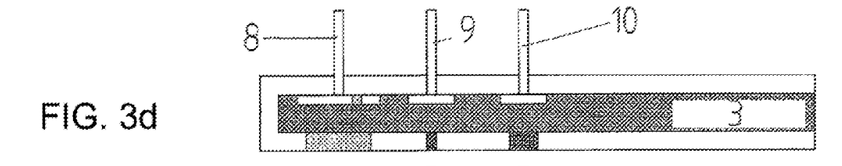
Figure 3E:
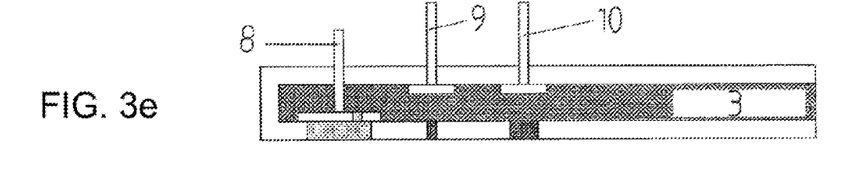

The fuel supply system shown in FIG. 1 includes a high-pressure supply line 1, into which a fuel metering unit 2 is incorporated and which issues into a single fuel line 3 situated in the hot engine section. Connected to the single fuel line 3 is a plurality of staged burners 4, each of which including a pilot injection nozzle 5 and a main injection nozzle 6. Associated to each such staged burner 4 is a staging valve arrangement 7 which, while being fed with the fuel supplied from the fuel metering unit 2 via the single fuel line 3, is circumcirculated by the fuel for cooling purposes and, as shown in FIG. 2, can be formed by a pilot valve 8 and a first and a second main valve 9 and 10. The pilot valve 8 and the main valves 9, 10 of the staging valve arrangement 7 are settable—preferably electro-magnetically or piezo-electrically—to a top and a bottom limit position, i.e. to an open position and a closed position, by use of signal lines 11, which are insulated against each other, and a common return line 12. In the bottom limit position of the pilot valve 8 shown in FIG. 2, only a small fuel flow cross-sectional area $A_1$ is released to the pilot injection nozzle 5, while in the top limit position thereof a large fuel quantity flows to the pilot injection nozzle 5 via the significantly larger fuel flow cross-sectional area $A_0$. The first and the second main valves 9 and 10 of the staging valve arrangement 7, which define an open position in the top limit position and—as shown in FIG. 2—a closed position in the bottom limit position, are related to two differently sized fuel flow cross-sectional areas $A_2$ (small) and $A_3$ (large).

FIGS. 3a-3e illustrate various switching states of the staging valve arrangement 7 for setting the ratio between the fuel quantity supplied to the pilot injection nozzle 5 and the fuel quantity supplied to the main injection nozzle 6. It is assumed in the following that a defined fuel flow passes through the single fuel line 3 to the staging valve arrangement 7 and, consequently, the pressure in the line changes in dependence of the switching state of the cutoff valves. With the first and second main valves 9, 10 (FIG. 3a) being closed and the pilot valve 8 being in the top limit position, a max possible fuel flow reaches the pilot injection nozzle 5 of the burner 4 and no fuel gets to the main injection nozzle 6. According to FIG. 3b, only the second main valve 10 is in the bottom limit position, as a result of which a smaller fuel flow than in the previous switching state gets to the pilot injection nozzle 5 and, via the smaller cross-sectional area $A_2$, a limited fuel flow to the main injection nozzle 6. In the switching state according to FIG. 3c, in which only the first main valve 9 is in the closed position, an even larger fuel quantity flows to the main injection nozzle 6, while the fuel flow to the pilot injection nozzle 5 is further reduced. According to the switching state shown in FIG. 3d, the three staging valves (cutoff valves 8, 9, 10) are in the top limit position (open position) so that the fuel volume flowing to the main injection nozzle 6 is further increased and the fuel flow to the pilot injection nozzle 5 further reduced. In the switching state according to FIG. 3e, only the pilot valve 8 is in the bottom limit position so that only a very small fuel flow gets to the pilot injection nozzle 5 via the small cross-sectional area $A_0$, while the main injection nozzle 6 is supplied with a maximum fuel quantity.

The above described staging valve arrangement 7 for the respective burner 4, which is associated to a single fuel line 3 with upstream fuel metering unit 2, enables different ratios of the fuel quantity supplied to the pilot injection nozzle 5 and to the main injection nozzle 6 to be set via only two switching positions (top/bottom limit position) of the individual staging valves (cutoff valves). Due to the only two switching positions of the cutoff valves, the staging valve arrangement 7 has a very good zero point stability and, as simply designed and individually electrically actuatable cutoff valves are employable here, can be provided with low investment and operated with low maintenance and low wear, i.e. it will feature a long service life. Furthermore, with the cutoff valves rapidly and tightly closing in minimum time, shutdown time upon shaft failure is reduced. Since the cutoff valves are arranged in the hot section of the gas-turbine engine, heat discharge is required which, however, can be effected by circumcirculating the valves with the fuel. Since only one (single) fuel line, which is permanently flown by fuel, is provided in the hot section of the engine, clogging of this fuel line due to coking is not to be feared.

Figure 4:
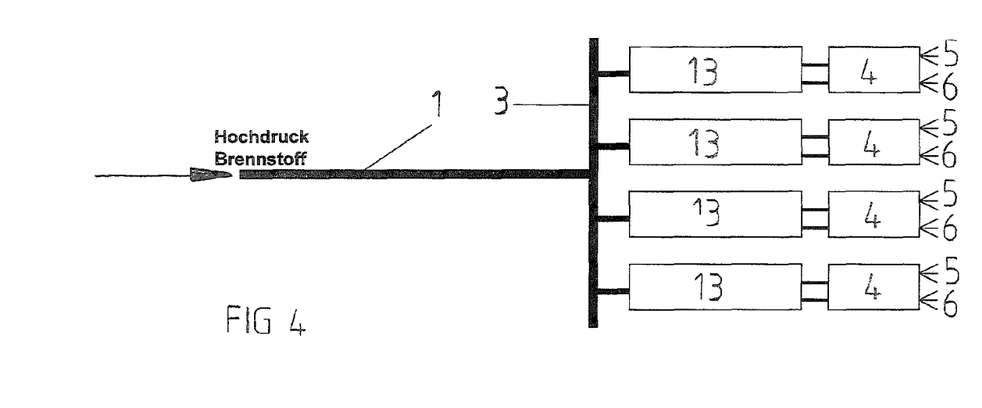
FIG. 4 is a fuel supply system with staged burners connected to a single fuel line and with a binary distribution valve arrangement associated to each of the burners, with the distribution valve arrangement acting as fuel metering valve arrangement.
Figure 5:
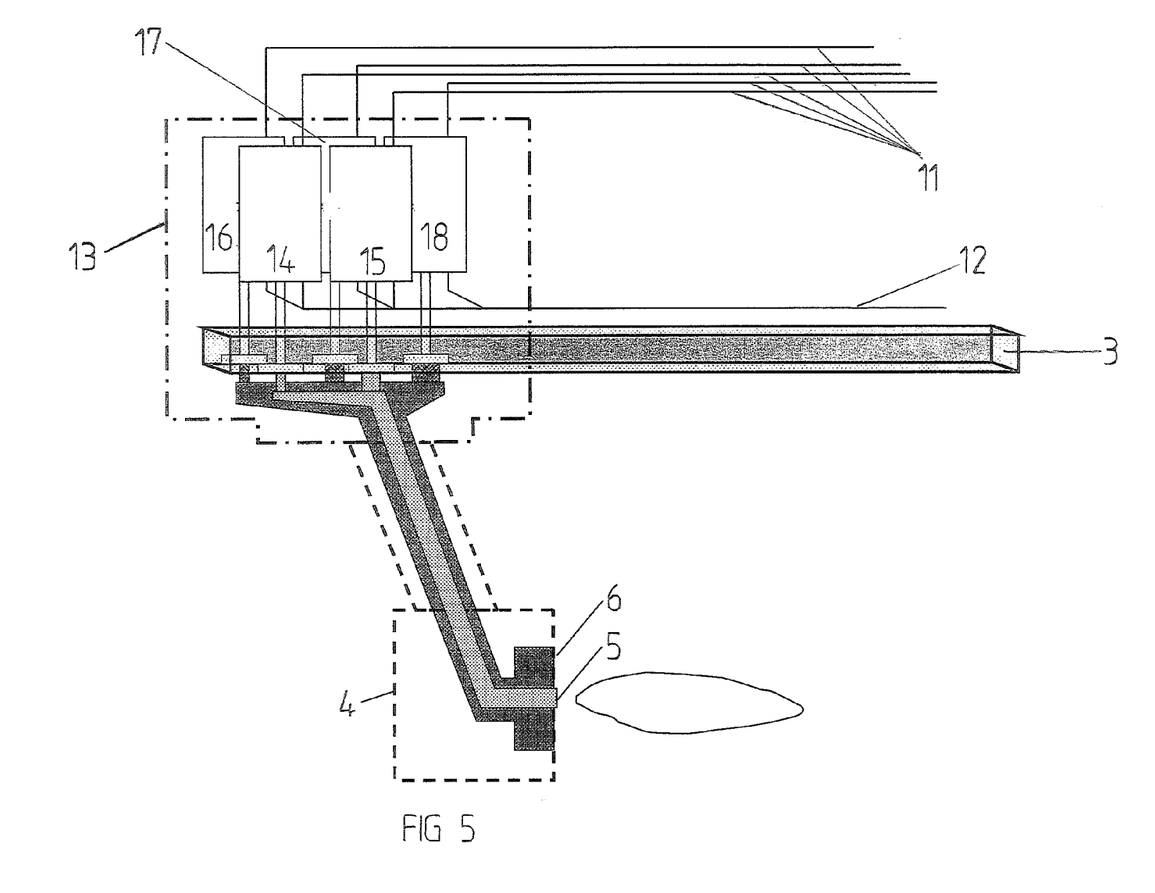
FIG. 5 is a detailed representation of the—staged—binary distribution valve arrangement provided upstream of a staged burner.

According to a second variant shown in FIGS. 4 and 5, fuel supply to the staged burner 4, i.e. to the pilot injection nozzle 5 and the main injection nozzle 6, can be solved by use of a binary distribution valve arrangement 13 which, being associated to each burner 4 and integrated in a single fuel line 3, is provided with the simply designed and controllable, low-wear and low-maintenance electrical pilot and main valves (cutoff valves) for setting the size of the fuel flow supplied to the pilot injection nozzle 5 and to the main injection nozzle 6, with these pilot and main valves being referred to in the above in connection with the staging valve arrangement 7. The binary distribution valve arrangement 13 in the embodiment exemplified in FIG. 5 includes a binary first and second pilot valve 14, 15 which release or close two different cross-sectional areas $A_4$ and $A_5$ to the pilot injection nozzle 5, thereby providing for a different—binary-coded—fuel supply to the pilot injection nozzle 5, actually in correspondence with the cross-sectional areas zero or $A_4$ or $A_5$ or $A_4$ plus $A_5$. In this context "binary-dimensioned" means that the ratio of the cross-sections of main valves or pilot valves, respectively, is based on 2 and allows a binary-coded fuel distribution as well as—with a plurality of binary pilot and main valves being provided and the fuel metering unit being omitted—a binary fuel metering to the pilot and to the main injection nozzle. Thus, with two cross-sectionally binary-dimensioned pilot valves $A_4$ and $A_5$, $A_5=2A_4$. For fuel supply to the main injection nozzle 6 of the staged burner 4, binary first to third main valves 16, 17 and 18 are provided which release or close, respectively, three differently large cross-sectional areas $A_6$, $A_7$ and $A_8$. The cross-sectional areas $A_7$ and $A_8$ are two and four times, respectively, the size of the cross-sectional area $A_6$, providing for a binary-coded fuel metering to the main injection nozzle 6 in accordance with the switching position of the main valves 16 to 18. Thus, with two cross-sectionally binary-dimensioned main valves $A_6$ and $A_7$, $A_7=2A_6$. If there were three cross-sectionally binary-dimensioned main valves, $A_6$, $A_7$ and $A_8$, $A_8=4A_6$.

In a weight and cost-saving embodiment, provision of the fuel metering unit 2 is dispensable, actually if—other than in the above exemplary embodiment—a larger number n of binary main and/or pilot valves is provided. On the basis of the minimum cross-sectional area $A_0=A_{min}$, the size of the other cross-sectional areas is then established from $A_n=2^n \cdot A_{min}$.

Figure 6:
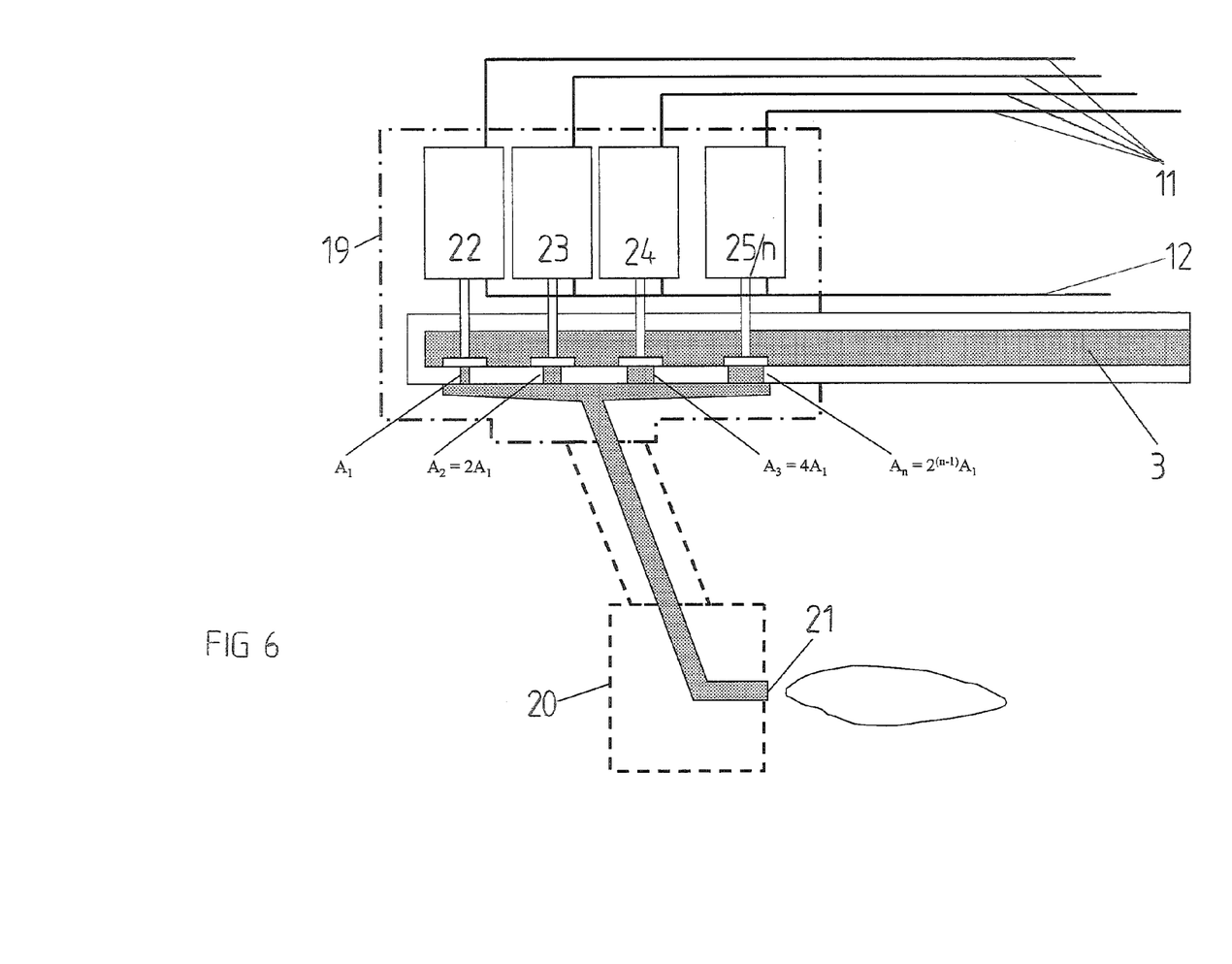
FIG. 6 is a detailed schematic representation of a binary metering valve arrangement associated to a non-staged burner.

FIG. 6 shows yet another corresponding binary metering valve arrangement 19 with n binary valves 22, 23, 24, 25 etc. for a non-staged burner 20 with only one injection nozzle 21. A binary metering valve arrangement 19 designed with a sufficiently large number of binary valves assumes the function of the fuel metering unit 2 still required in the embodiments described in the above.

Individual valves of the valve arrangement can be actuated by impulse-width modulation, enabling the fuel to be metered on a basis of actuation time and impulse width. The cutoff valves can be designed such, that in a de-energized failure state, they either remain in a last valve position or assume a defined position.

LIST OF REFERENCE NUMERALS

1 High-pressure supply line
2 Fuel metering unit
3 Single fuel line
4 Staged burner
5 Pilot injection nozzle
6 Main injection nozzle
7 Staging valve arrangement
8 Pilot valve (cross-sectional area $A_0$, $A_1$)
9 First main valve (cross-sectional area $A_2$)
10 Second main valve (cross-sectional area $A_3$)
11 Signal lines
12 Return line
13 Binary distribution valve arrangement, staged
14 First binary pilot valve (cross-sectional area $A_4$)
15 Second binary pilot valve (cross-sectional area $A_5$)
16 First binary main valve (cross-sectional area $A_6$)
17 Second binary main valve (cross-sectional area $A_7$)
18 Third binary main valve (cross-sectional area $A_8$)
19 Binary metering valve arrangement, non-staged
20 Non-staged burner
21 Injection nozzle of 20
22 Binary valve
23 Binary valve
24 Binary valve
25 Binary valve

What is claimed is:

1. A fuel supply system for a gas-turbine engine, comprising:
a high-pressure supply line;
a fuel distribution system connected to burners of the engine to control a fuel quantity supplied to individual burners, the fuel distribution system including a single fuel line and, directly associated with each burner, a valve arrangement having a plurality of cutoff valves which are each independently electrically actuatable between a closed limit position and an open limit position, with each cutoff valve having a specific cross-sectional flow area ($A_o$ to $A_n$) different than the other cutoff valves when the valves are in their open limit positions;
wherein the valve arrangement is a staged valve arrangement for use with a staged burner having a pilot injection nozzle and a main injection nozzle for controllable fuel distribution, the plurality of cutoff valves including at least one pilot valve for increasing and decreasing fuel to the pilot injection nozzle and at least one main valve for increasing and decreasing fuel to the main injection nozzle, the at least one main valve comprising a first main valve and a second main valve, wherein the at least one pilot valve, the first main valve, and the second main valve each have a different one of the cross-sectional areas ($A_o$ to $A_n$);
each of the at least one pilot valve and the at least one main valve located within the single fuel line such that when the at least one main valve is in an open state, a pressure in the single fuel line is reduced to reduce flow through the at least one pilot valve when the pilot valve is in a state allowing fuel flow therethrough to the pilot injection nozzle.

2. The fuel supply system of claim 1, wherein different fuel flows reach the pilot injection nozzle depending on a completely or partly closed position of the main valves and the pilot valve, and with different fuel flows reaching the main injection nozzle depending on the closed or open position of the main valves.

3. The fuel supply system of claim 1, wherein the valve arrangement includes at least one chosen from: at least two cross-sectionally binary-dimensioned pilot valves $A_4$ and $A_5$, where $A_5=2A_4$, and, at least two cross-sectionally binary-dimensioned main valves $A_6$ and $A_7$, where $A_7=2A_6$.

4. The fuel supply system of claim 1, wherein the valve arrangement includes a plurality of cross-sectionally ($A_0=A_{min}$ to $A_n$) binary-dimensioned binary valves, whose respective cross-sectional area is $A_n=2^n \cdot A_{min}$.

5. The fuel supply system of claim 1, wherein the electrically actuatable cutoff valves are each connected to signal lines, individually or in groups, and, collectively or in groups, to one or several return lines, which can also be used as alternative signal lines.

6. The fuel supply system of claim 5, wherein the cutoff valves are at least one of solenoid valves and piezo-electrical valves.

7. The fuel supply system of claim 1, wherein the cutoff valves are circumcirculated by fuel flow for cooling purposes.

8. The fuel supply system of claim 1, wherein the cutoff valves are incorporated into a single fuel line.

9. The fuel supply system of claim 1, wherein the valve arrangements or groups of valve arrangements can be actuated independently of each other.

10. The fuel supply system of claim 1, wherein individual valves of the valve arrangement are actuated by impulse-width modulation, enabling the fuel to be metered on a basis of actuation time and impulse width.

11. The fuel supply system of claim 1, wherein the individual cutoff valves have two defined limit positions and one center position.

12. The fuel supply system of claim 1, wherein the cutoff valves in a de-energized failure state assume at least one chosen from remaining in a last valve position and assuming a defined position.

13. The fuel supply system of claim 1, wherein individual valves of the valve arrangement are actuated by impulse-width modulation, enabling the fuel to be metered on a basis of actuation time and impulse width.

14. The fuel supply system of claim 2, wherein the pilot valve includes a primary cross-sectional area ($A_o$) and a smaller secondary cross-sectional area ($A_1$) associated with the primary cross-sectional area ($A_o$), the pilot valve opening and closing the primary cross-sectional area ($A_o$) for altering a supply of fuel through the primary cross-sectional area ($A_o$) to the pilot injection nozzle, while leaving open the smaller secondary cross-sectional area ($A_1$) for continuing to supply fuel to the pilot injection nozzle when the primary cross-sectional area ($A_o$) is in the closed state.

15. The fuel supply system of claim 14, wherein the secondary cross-sectional area ($A_1$) is positioned on a portion of the pilot valve that moves to open and close the primary cross-sectional area ($A_o$).

* * * * *